United States Patent [19]
Ebbers et al.

[11] Patent Number: 5,148,521
[45] Date of Patent: Sep. 15, 1992

[54] PICK DATA QUEUE FOR PIPELINED GRAPHICS SYSTEM

[75] Inventors: Timothy J. Ebbers, Shokan; Daniel G. Gibbons, Ulster Park, both of N.Y.

[73] Assignee: International Business Machines Corporation, Armonk, N.Y.

[21] Appl. No.: 425,776

[22] Filed: Oct. 23, 1989

[51] Int. Cl.⁵ .............................................. G06F 15/20
[52] U.S. Cl. ..................................... 395/155; 395/163
[58] Field of Search ................ 364/518, 521; 340/721, 340/716, 723; 395/155–161

[56] References Cited

U.S. PATENT DOCUMENTS

| | | | |
|---|---|---|---|
| 4,656,603 | 4/1987 | Dunn | 364/521 X |
| 4,764,867 | 8/1988 | Hess | 364/521 X |
| 4,982,345 | 1/1991 | Callahan et al. | 364/521 |

Primary Examiner—Heather R. Herndon
Attorney, Agent, or Firm—William A. Kinnaman, Jr.; Mark S. Walker

[57] ABSTRACT

A pick queue and pick detection method that allows non-hierarchical graphic data models and applications to be used with pipelined processing systems. Pretransformed formatting logic is placed prior to pipeline processors to store necessary picking information in a pick queue. A pick tag addressing the pick queue is passed with each graphics order through the pipeline and stored in the pick detect logic. The pick detect logic interrupts the graphics control processor that then accesses the tag register associated with the graphics order and the coordinate counter to address the stored pick information of the order triggering the pick. The graphics processor uses the tag address and coordinate counter to indirectly address the pick queue and retrieve the information that needs to be passed back to the application program. The structure eliminates the requirement to pass all information through the pipeline processors.

14 Claims, 1 Drawing Sheet

PICK DATA QUEUE FOR PIPELINED GRAPHICS SYSTEM

BACKGROUND OF THE INVENTION

1. Field of the Invention

This invention relates in general to computer graphics display systems, and more particularly to apparatus and methods for identifying a displayed object in an operator selected area of the display screen to facilitate operator selection of an object from a complex display.

2. Description of the Prior Art

Interactive raster graphics systems, such as Computer Aided Design and Computer Aided Manufacturing (CAD/CAM) workstations, are widely used to design components of systems of mechanical, electrical, electromechanical and electronics devices. Frequently, the emphasis within such systems is on operator interaction with the computer based model of a component or system being designed in order to modify the model or to test, for example, its mechanical, electrical or thermal properties. A computer based model is comprised of numerous graphics objects that are individually processed and displayed for operator action. Operator selection of a displayed object is accomplished via any one of a number of operator controlled interaction devices, such as light pens, locators (e.g., a data tablet with stylus), and alphanumeric and function keyboards. An important part of many interaction sequences is computer identification of an operator selected displayed object to be operated upon, a process known as "picking". The picking process is complicated by the pipeline processing techniques utilized in most modern graphics systems.

Determining the object "picked" in the display program requires the graphics controller to provide enough information for the application program to locate that object. Typically, graphics system processing techniques require the processing of an entire display screen to identify a particular displayed object selected or picked for further processing. Most existing processing methods require the re-execution of the display list including: transformation of each geometric primitive defining a displayed object in world coordinate space; clipping of each transformed primitive against the predefined clipping boundary in world coordinate space; mapping of each clipped primitive to an operator defined viewport and screen coordinate space; rasterization of all mapped data; and finally determination of whether the generated pixels intersect the operator defined selection area or window in screen coordinate space. If so, then a pick occurs.

Modern graphics display systems employ a set of pipelined processors to perform the transformation, mapping and clipping operations. The pipeline processors increase graphics processing speed by working concurrently on several graphics orders. The use of pipelined processors, however, introduces a problem in pick detection because picking typically occurs at the end of the pipeline when the graphics control processors has advanced to processing a subsequent graphics order. When a pick occurs, the pick detect logic will interrupt the graphics control processor that must, in turn, return the necessary information to the application program for action on the pick.

Earlier generations of graphics display systems did not used piplined processors. In those systems the drawing status in the graphics control processor stayed constant through pick detect processing. In those systems when a pick occurred the graphics processor contained the correct state information for communication to the application program.

Current generation graphics processing systems operate on hierarchical graphics data structures that can be more easily referenced to deal with the picking delay inherent in a pipeline processing system. Graphics data and graphics application developed for earlier generation graphics display systems typically were based on non-hierarchical data and were frequently implemented without consideration for pipelining concepts. This has created a serious problem when these earlier generation models or applications are moved to current generation devices.

SUMMARY OF THE INVENTION

The present invention is directed to providing an apparatus and method of processing to allow non-hierarchical graphics data models and applications to be executed using pipelined graphics display systems.

It is an object of the present invention to provide an effective and efficient system for managing picking information in a pipelined processing display system processing non-hierarchical models.

It is a further object of the invention to implement an efficient pick queue for storing the necessary pick detection information.

DETAILED DESCRIPTION OF THE PREFERRED EMBODIMENT

Figure 1:
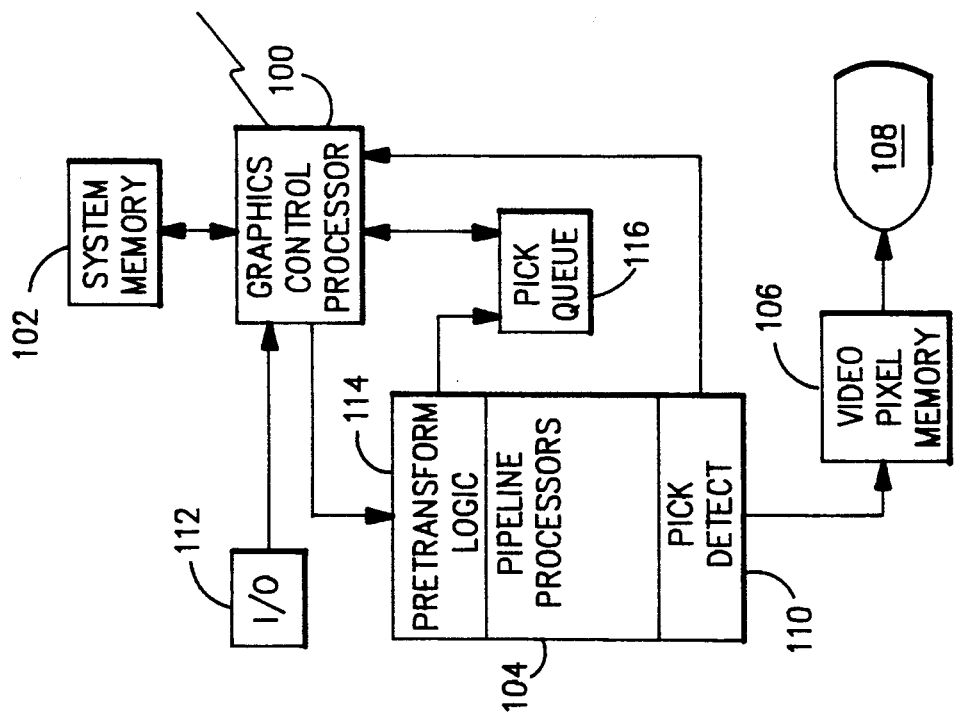
FIG. 1 is a block diagram of a graphics display system employing the present invention.

A graphics display system according to the present invention is shown in FIG. 1. Graphics control processor 100 controls the processing of graphics display orders received from a host system and stored in system memory 102. Graphics control processor 100 decodes drawing orders and transmits them to pipelined processing logic 104. Pipeline processors perform transformation, clipping, and mapping operations and, finally, the drawing operations necessary to generate pixel images to video pixel memory 106 for eventual display on display monitor 108.

The present invention is related to the portions of the pipeline processing logic performing pick detection. Pick detect logic 110, at the end of the pipeline processors, serves to detect operator selection based on input from I/O controller 112. The present invention controls pick detection and pick data storage using pretransform logic 114 and pick queue 116 that provides the advantages of the present invention.

Determining the object picked by an operator requires the graphics control processor 100 to provide sufficient information for the application program to locate the selected object. The application information transmitted to the application program must contain enough information to identify the picked object in the display list program. The following information is typically transmitted:

The system address is the location in the memory program of the graphics order and the primitive causing the pick detect.

The order address is the address of the order in the display program that cause the pick event.

The primitive address is the address of the output primitive coordinate in the order display list that cause the pick event.

The segment name is the identifier which identifies the graphics context.

The current draw position is the current value of the X, Y, Z position registers in the pretransformed world coordinate space. Each position register is typically maintained as a 16-bit value.

Current generation graphics display systems typically perform the transformation processing using floating point coordinate values. Many previous generation display systems operated only with fixed point values. Therefore, compatibility frequently requires a conversion between the fixed and floating point representations.

The requirement of providing pre-transformed coordinate values and attributes of the picked primitive requires provision of some means for tracking this information through the pipeline processor. Where prior generation graphics systems merely maintained the order and pretransformed positions until picking occurred, current generation systems process ahead and may have changed the state values before a pick is detected.

One approach to solving the problem is to pass the excess required information through the pipeline with each graphics order and coordinate. However, this approach would create a large amount of unnecessary data in the pipeline path and would slow graphics pipeline processing. For each coordinate triple (e.g., X, Y, Z), the graphics controller would have to send down four extra pieces of data, (the primitive address and pretransformed X, Y, and Z coordinates), and would have to send four additional data points (control, order address, page address, and segment name) every time a new order was processed. Because pick events happen infrequently the graphics pipeline would be clogged with a large amount of unnecessary data reducing the overall performance of the graphics display system.

The present invention provides a method for storing necessary pick data quickly and efficiently so it can be rapidly accessed by the graphics controller when required without copying the information through the transformation pipeline. The invention relates to providing pretransform formatting logic at the head of the graphics pipeline; providing a pick data queue; and passing addressing information through the pipeline. The pretransform formatting converts each vector coordinate into a standard format (for example, from fixed to floating point) and feeds them into the pipeline. Simultaneously, the pretransform logic stores necessary pick information into an external random access memory or pick queue.

Figure 2:
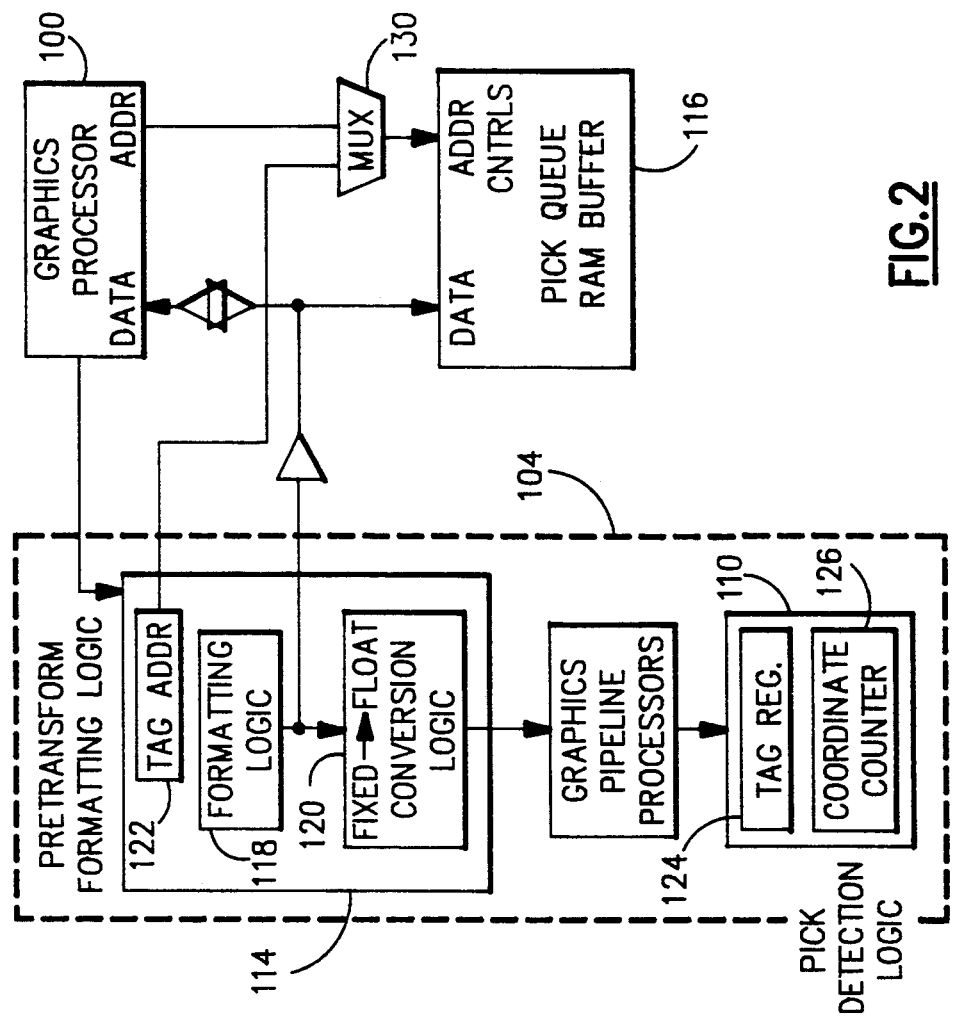
FIG. 2 is a block diagram of the components of a system using the present invention.

Additional detail of the pretransform logic is shown in FIG. 2. Pretransform formatting logic 114 contains formatting logic section 118, fixed to floating point conversion logic 120, and tag address 112. The tag address is used to access the pick queue 116 for storing necessary pick data. Graphics processor 100 decodes an executes graphics orders from a display list contained in system memory 102. As each graphics order is received by the pretransform formatting logic, the tag address 122 is incremented and associated with that graphics order. In the preferred embodiment, pretransform formatting logic has a 32-bit data interface to the pick queue. Six pieces of data formatted into three 32-bit segments are sent to the pick queue for every vector sent down the graphics pipeline. This information is sufficient to completely identify the picked coordinate to the application program after picking. The tag address is incremented before storing each segment and serves as the pick queue address. The format of the data sent to the pick queue in the preferred embodiment is as follows:

System address (low)/X coordinate (untransformed)

The system address (low) contains the lower 16-bits of a 32-bit system address that contains this particular coordinate of the vector. The X coordinate is the untransformed 16-bit X value of the vector.

System address (high)/Y coordinate (untransformed)

The system address (high) contains the upper 16-bits of a 32-bit system address that contains this particular coordinate of the vector. The Y coordinate is the untransformed Y value of the vector.

Order address (low)/Z coordinate (untransformed)

The order address contains the lower 16-bits of a 32-bit system address of the graphic order that draws or moves this particular vector. The upper 16-bits of the graphic order system address are the same as the system address (high) of the coordinate. The Z coordinate is the untransformed Z value of the vector. If the graphic order is a two-dimensional the Z value is forced to zero.

Formatting logic 118 is responsible for formatting the pick queue information and transmitting it to pick queue buffer 116 for storage at the point indicated by tag address 122.

Fixed to float conversion logic 120 performs the necessary data conversion for the vector coordinate.

The pick queue 116 is designed as a circular queue. A tag address is implemented in the pretransform logic and increments for every coordinate element sent down the pipeline. The tag pointer serves as an indirect address pointer to the pick queue when the graphics processor retrieves pick data. The tag pointer wraps around when the pick queue limit is reached. The pick queue is set to be larger than the maximum number of pipeline levels. In this way, each piece of data in the transformation pipeline has a pick status history and is guaranteed not to be overwritten until the data has been processed for potential events.

The pretransforms formatting logic passes the tag address for each graphics order through the graphics pipeline to pick detection logic 110. It does not pass the tag address for each coordinate. For example, a draw polyline command will be followed by several sets of coordinates for each vertex of each list. Only the initial polyline command will contain the tag address. The tag address for each order is stored in tag register 124 of the pick detect logic. As each coordinate is passed through the pick detection logic coordinate counter 126 is incremented. Pick, detect logic 110 contains the circuitry necessary to detect the presence of a pick condition, retain valid information, and stop the pipeline processors from further processing until the pick condition is serviced. This module 110 contains the tag register, and coordinate counter, that contain the indirect address needed in locating the proper coordinates in the pick queue. When a pick occurs an interrupt is generated to the graphics processor 100. Graphics processor 100 then accesses the tag register 124 and coordinate counter 126 and uses them to indirectly address the pick queue and extract the detailed information concerning the picked coordinate.

The pick queue of the preferred embodiment is implemented as a static random access memory external to the pretransform formatting logic. In the preferred embodiment, this memory has two write sources and a read source. Address multiplexing logic 130 at the address input selects whether the pretransform formatting logic or the graphics controller is accessing the pick queue. The data bus on both controllers are connected together and tri-state enable control logic determines which bus has access to the memory contents. When the pretransformed formatting logic is writing into the pick queue buffer, the graphics processor operations are halted and the local data and address bus is released. The preferred embodiment uses a portion of the graphics control processor local memory. Alternate implementation using memory external to both the GCP and pretransform logic would be within the scope of the invention.

The pick queue according to the present invention has the advantage of being located near the graphics controller in a pipeline graphics system. The pick status information generated by the graphics controller is stored in the pick queue prior to pipeline processing. Only the tag address associated with each graphics order is passed through the pipeline. Thus, the pipeline does not pass unnecessary volumes of data. The system of the present invention has been implemented so that three 32-bit data values contain all information needed by the application program to process the picked primitive. The pick queue according to the present invention has the advantage of supporting non-hierarchical graphic data structures and, therefore, earlier generation application pick handling logic.

Although a specific implementation has been described, the invention is not limited to this particular implementation. For example, different forms of data storage and types of data contained in the storage are possible within the scope of the invention.

We claim.

1. a graphics display system for displaying on a display device an image generated based on graphics orders, said system having operator selection means allowing operator selection of a specific object in said image on said display device, said graphics orders having no hierarchical arrangement; said image being generated using pipeline processors, said graphics orders being supplied to said pipeline processors for conversion of said image, the system comprising:
   means for generating pick data from said graphics orders;
   memory means for storing said pick data, said memory means being accessed by a tag address;
   transmitting means for passing said tag address through said pipeline processors;
   pick detection means for determining when portion of said image is selected by said operator selection;
   means for communicating to a graphics processor said operator selection;
   said pick detection means having register means for storing the tag address associated with each graphics order and loaded from said transmitting means, and a counter means for counting each coordinate contained in a graphics order;
   wherein said graphics processor accesses said register means and counter means and uses their contents to address said memory means when an operator selection has occurred.

2. A method for storing pick information in a graphics display system where graphics orders are supplied to a graphics pipeline for conversion to an image and where pick detection occurs at a pipeline stage offset from graphics processor control, said method comprising the steps of:
   generating pick information identifying a graphics order;
   storing said pick information in a memory structure accessible by a tag address;
   transforming said graphics orders using said graphics pipeline;
   transmitting said tag address through said graphics pipeline with said graphics orders;
   storing a tag register value in a tag register for each graphics order, said tag register value being equal to said tag address;
   counting each coordinate value associated with a graphics order using a coordinate counter;
   detecting operator selection of a portion of said image;
   accessing said tag register and coordinate counter by a graphics processor upon detection of said operator selection;
   accessing said pick information using an address calculated from the contents of said tag register and said coordinate counter.

3. In a graphics system containing a graphics pipeline having an input end and an output end, said input end of said graphics pipeline receiving graphics orders representing objects for conversion to an image containing said objects for display by a display device, apparatus for generating pick data identifying graphics orders representing operator-selected objects comprising:
   an addressable memory;
   means for storing pick data identifying one of said graphics orders at a predetermined location in said memory;
   means for supplying said graphics order and a tag address indicating said predetermined location to the input end of said graphics pipeline to generate an output together with said address at the output end of said pipeline;
   pick detection means responsive to said output from said pipeline for detecting the operator selection of the object represented by said graphics order; and
   means responsive to the detection of said operator selection by said pick detection means for accessing the location in said memory indicated by said tag address at the output end of said pipeline to generate said pick data.

4. Apparatus as in claim 3 in which said pick detection means comprises;
   a tag register; and
   means responsive to the generation of a tag address at the output end of said pipeline for storing said tag address in tag register.

5. Apparatus as in claim 4 in which said graphics order contains coordinate values that are supplied to said pipeline to generate transformed coordinate values at the output end of said pipeline, said pick detection means comprising;
   a coordinate counter; and
   means responsive to the generation of one of said transformed coordinate values at the output end of said pipeline for incrementing said coordinate counter.

6. Apparatus as in claim 5 in which said accessing means uses the contents of said coordinate counter as an offset from the address stored in said tag register.

7. Apparatus as in claim 3 in which said accessing means comprises:
processor means operable upon the receipt of a signal to access said memory; and means responsive to the detection of said operator selection by said pick detection means for supplying said signal to said processor means.

8. Apparatus as in claim 3 in which said graphics pipeline contains a predetermined number of levels, said memory containing at least said predetermined number of locations.

9. In a graphics system containing a graphics pipeline having an input end and out output end, said input end of said graphics pipeline receiving graphics orders representing objects for conversion to an image containing said objects for display by a display device, a method for generating pick data identifying graphics orders representing operator-selected objects comprising the steps of:
storing pick data identifying one of said graphics orders at a predetermined location in a memory;
supplying said graphics order and a tag address indicating said predetermined location to the input end of said graphics pipeline to generate an output together with said tag address at the output end of said pipeline;
detecting the operator selection of the object represented by said graphics order in response to said output from said pipeline; and
accessing the location in said memory indicated by said tag address at the output end of said pipeline in response to the detection of said operator selection to generate said pick data.

10. A method as in claim 9 in which the tag address generated at the output end of said pipeline is stored in a tag register.

11. A method as in claim 10 in which said graphics order contains coordinate values that are supplied to said pipeline to generate transformed coordinate values at the output end of said pipeline and in which a coordinate counter is incremented in response to the generation of one of said transformed coordinate values at the output end of said pipeline.

12. A method as in claim 11 in which the contents of said coordinate counter are used as an offset from the address stored in said tag register to access said memory.

13. A method as claim 9 in which a processor is actuated in response to the detection of said operator selection to access said memory.

14. A method as in claim 9 in which said graphics pipeline contains a predetermined number of levels, said memory means containing at least said predetermined number of locations.

* * * * *